United States Patent
Nalini et al.

(10) Patent No.: US 8,235,354 B2
(45) Date of Patent: Aug. 7, 2012

(54) REGULATING VALVE, PARTICULARLY FOR REGULATING THE FLOW OF FLUIDS IN REFRIGERATION SYSTEMS

(75) Inventors: Luigi Nalini, Padua (IT); Andrea Dalan, Cadoneghe (IT)

(73) Assignee: Carel Industries S.R.L., Brugine (IT)

( * ) Notice: Subject to any disclaimer, the term of this patent is extended or adjusted under 35 U.S.C. 154(b) by 335 days.

(21) Appl. No.: 12/461,356

(22) Filed: Aug. 10, 2009

(65) Prior Publication Data

US 2010/0037964 A1 Feb. 18, 2010

(30) Foreign Application Priority Data

Aug. 18, 2008 (IT) .............................. PD2008A0252

(51) Int. Cl.
*F16K 31/04* (2006.01)
(52) U.S. Cl. ................................... 251/129.07; 251/282
(58) Field of Classification Search ............. 251/129.07, 251/282
See application file for complete search history.

(56) References Cited

U.S. PATENT DOCUMENTS

| | | | |
|---|---|---|---|
| 2,630,292 A | 3/1953 | Skweir | |
| 3,601,147 A | 8/1971 | Myers | |
| 3,700,209 A * | 10/1972 | Usry | ............................. 251/282 |
| 3,892,384 A | 7/1975 | Myers | |
| 6,568,656 B1 | 5/2003 | Wrocklage | |
| 7,240,694 B2 * | 7/2007 | Johnsen et al. | .......... 137/630.15 |

* cited by examiner

*Primary Examiner* — William McCalister
(74) *Attorney, Agent, or Firm* — Modiano & Associati; Albert Josif; Daniel O'Byrne

(57) ABSTRACT

A regulating valve for regulating the flow of fluids in refrigeration systems has a valve body that has an inlet and an outlet for fluid, connected by a connecting opening, a flow control device for the opening, which is inserted in the valve body and comprises a flow control piston for the connecting opening that is driven by an electric motor along a sliding axis between an open position and a blocking position of the connecting opening. The flow control piston has openings for connection between a front face, which is directed toward the connecting opening, and a rear face thereof for balancing pressures applied by the fluid to the front face, and a head dome facing the connecting opening and forming the front face, the connection openings comprising a plurality of holes passing through the dome.

7 Claims, 4 Drawing Sheets

REGULATING VALVE, PARTICULARLY FOR REGULATING THE FLOW OF FLUIDS IN REFRIGERATION SYSTEMS

BACKGROUND OF THE INVENTION

Currently, valves for regulating the flow of fluid in refrigeration systems have a structure that comprises
- a valve body, provided with an inlet and an outlet for the fluid, which are connected by a connecting compartment,
- a connecting compartment flow control device, inserted in an appropriately provided seat formed in the valve body.

The flow control device comprises a connecting compartment flow control piston, which is functionally connected to an electric motor.

The position of the piston during use is modulated by the action of the electric motor between an open position and a blocking position for the connecting compartment.

During the use of this type of valve, the action of the fluid on the piston is not constant as its position varies with respect to the connecting compartment.

This entails that the flow control device is subjected to different forces depending on the position imparted by the electric motor to the piston.

These forces are substantially due to the difference between the pressures that the fluid applies to a front face of the piston, which is directed toward the connecting compartment, and the pressures that the piston experiences on a rear face thereof that lies opposite thereto.

Pistons are currently known which have connection compartments that cross them, connecting the regions in front of such faces in order to balance the pressures that act thereon in certain operating conditions.

In particular, U.S. Pat. No. 6,568,656 discloses a piston provided with a frustum-shaped head in which there are one or more holes that constitute ports for connection to the described connecting compartments.

A valve according to the teaching of this patent has the frustum-shaped head that is perforated in predefined positions, which are determined in order to minimize the resultant of the pressure forces applied by the fluid to the piston in use when it is in a chosen modulation position with respect to the connecting compartment.

Such predefined positions are determined on the basis of the provided fluid-dynamics behavior of the fluid that during use affects the valve.

Therefore, the holes in the frustum-shaped head are provided at the region where the fluid will have, during use, a pressure which, applied to the rear face of the flow control piston, allows to obtain substantial balancing of the forces that it experiences in the predefined position.

One drawback of a valve provided according to this teaching is that the pressure forces experienced by the piston during use of the valve, despite being substantially balanced when it is in the predefined position, are highly variable with the modulation of its position with respect to the connecting compartment during use of the valve.

Further, a valve provided according to the teaching of this patent is dedicated to a predefined use, its geometry being predetermined as a function of its design operating conditions.

A valve thus dedicated to use in predefined operating conditions therefore does not have a flexibility in application that currently is felt as an increasingly substantial quality, aimed at meeting the standardization requirements that lead to simplicity in logistical management and to lower production cost.

SUMMARY OF THE INVENTION

The aim of the present invention is to provide a regulating valve that allows a balancing of the pressures experienced by the piston during use that is effective substantially in all of the positions that it assumes between the open position and the position for blocking the connecting compartment.

Within this aim, an object of the invention is to provide a valve that allows prompt substantial balancing of the pressures experienced by the piston in use during the modulation of its position with respect to the connecting compartment.

Another object of the invention is to provide a valve that can be used in an equivalent manner if the flow of fluid passing through it is reversed.

Another object of the invention is to provide a valve that is simple and easy to use and can be manufactured with relatively low costs.

This aim and these and other objects that will become better apparent hereinafter, are achieved by a regulating valve, particularly for regulating the flow of fluids in refrigeration systems, comprising
- a valve body that has an inlet and an outlet for fluid, which are connected by a connecting compartment,
- a flow control device for said connecting compartment, which is inserted in a provided seat formed in said valve body and comprises a flow control piston that is functionally connected to an electric motor for its axial movement along a sliding axis, in a manner that can be modulated between an open position and a blocking position of said connecting compartment, said piston having compartments for connection between a front face thereof, which is directed toward said compartment, and a rear face thereof for balancing the pressures applied by the fluid to said front face, said valve being characterized in that said piston has a head dome that faces said compartment and forms said front face, said connecting compartments comprising a plurality of holes that pass through said dome.

BRIEF DESCRIPTION OF THE DRAWINGS

Further characteristics and advantages of the invention will become better apparent from the following detailed description of some preferred but not exclusive embodiments of the valve according to the invention, illustrated by way of non-limiting example in the accompanying drawings, wherein.

DESCRIPTION OF THE PREFERRED EMBODIMENTS

Figure 1:
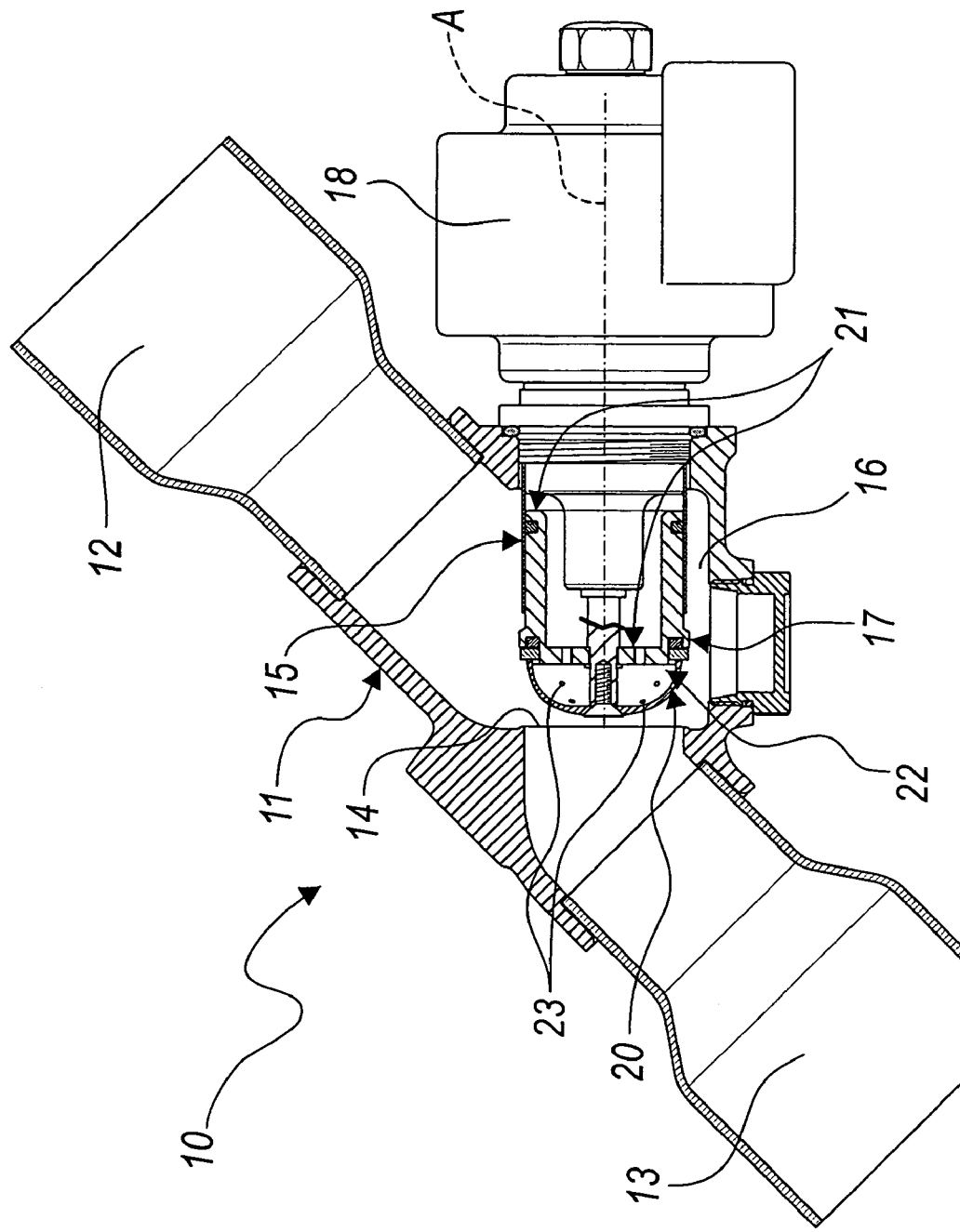
FIG. 1 is a partially sectional side elevation view of a valve according to the invention.

It is noted that anything found to be already known during the patenting process is understood not to be claimed and to be the subject of a disclaimer.

With reference to the figures, the reference numeral 10 generally designates a regulating valve, particularly for regulating the flow of fluids in refrigeration systems, which comprises a valve body 11, which has an inlet 12 and an outlet 13 for fluid, which are connected by a connecting opening 14, a flow control device 15 for the connecting opening 14, which is inserted in a provided seat 16 that is formed in the valve body 11 and comprises a flow control piston 17, which is functionally connected to an electric motor 18 for its axial movement along a sliding axis A, in a manner that can be modulated or controlled between an open position and a blocking position of the connecting opening 14.

The flow control piston 17 has openings 19 for connection between a front face 20 thereof, which is directed toward the connecting opening 14, and a rear face 21 thereof, for balancing the pressures applied by the fluid to the front face 20.

The valve 10 has a particularity in that the flow control piston 17 has a head dome 22 that faces the connecting opening 14 and is provided with a plurality of holes 23 that pass through the thickness of the dome 22 and belong to the connection openings 19.

The outer surface of the dome 22 forms the front face 20 of the flow control piston 17.

Advantageously, the dome 22 has a substantially symmetrical structure around an axis of extension B thereof, which during use conveniently coincides with the sliding axis A.

The holes 23 are provided on the dome 22 at radial distances from the axis of extension B that preferably increase according to an inverse square progression.

In other words, the radial distances from the axis of extension B of the centers of the ports of the holes 23 virtually on the outer surface of the dome 22 increase radially according to $1/r^2$, where r is the radial distance from the axis of extension B.

Figure 5A:
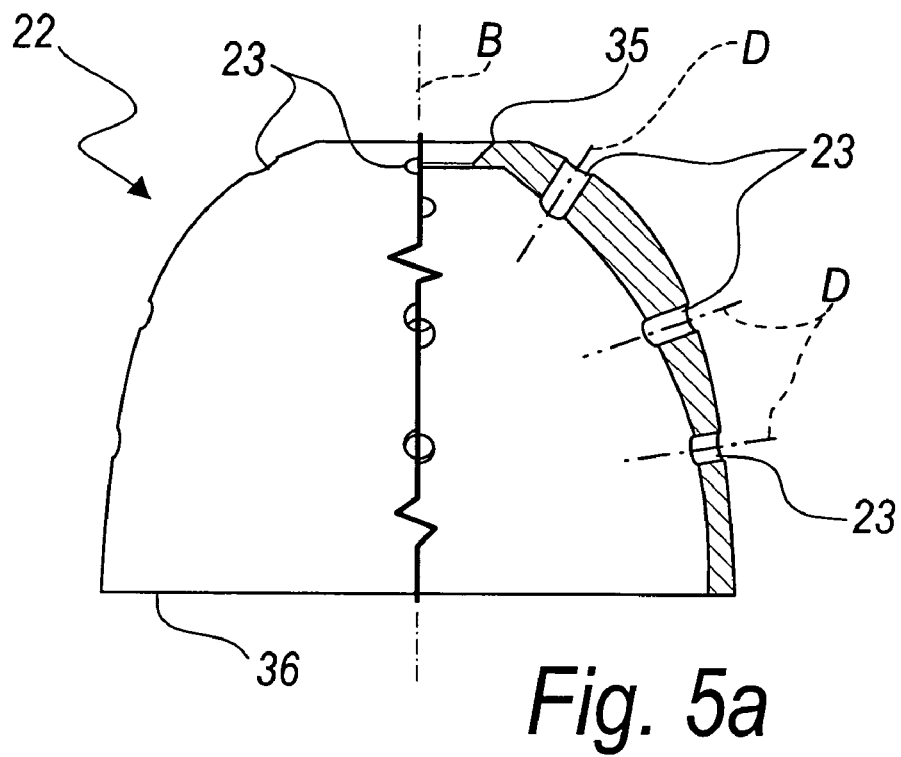
FIGS. 5a and 5b are respectively a side elevation view and a plan view of a dome of the valve according to the invention.
Figure 5B:
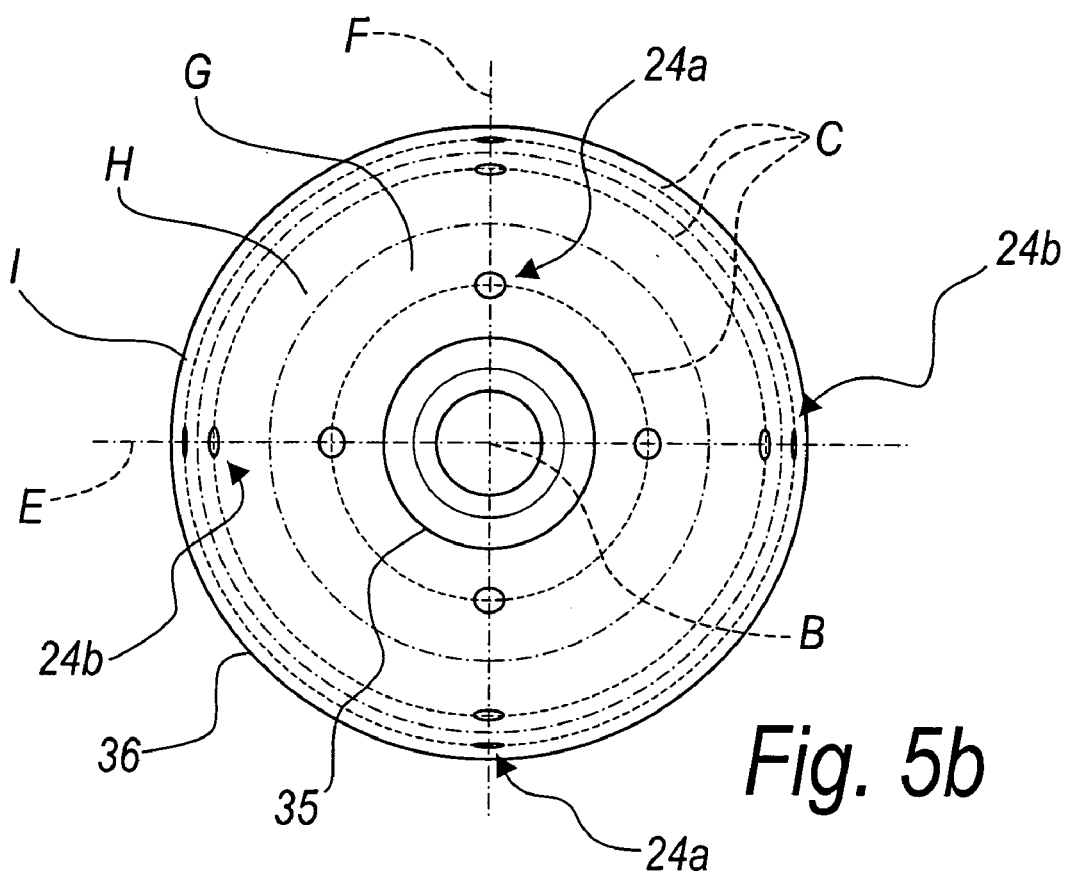

Moreover, with particular reference to FIG. 5b, the holes 23 have the centers of their outer ports, which are virtually located on the outer surface of the dome 22, on circumferences C that are mutually spaced from the axis of extension B, constituting circumferences that divide into two rings of equal area the annular bands of mutually equal area into which it is possible to divide the plan projection of the dome 22.

Further, the holes 23 are conveniently provided on the dome 22 in groups 24a and 24b which are symmetrical with respect to the axis of extension B.

FIG. 5b illustrates by way of non-limiting example an embodiment of the dome 22, according to which there are two first groups 24a and two second groups 24b which are symmetrical with respect to the axis of extension B.

Conveniently, between the holes 23, the ones that belong to a same group 24a or 24b have central axes D that substantially lie on a common plane E or F that is radial to the axis of extension B.

In particular, the holes 23 that belong to the first group 24a have their respective central axes D that lie on a first plane E that is radial to the axis of extension B, the holes 23 of the second group 24b having their respective central axes D arranged on a second plane F that is radial with respect to the axis of extension B and is conveniently perpendicular to the first plane E.

Further, the central axes D are locally substantially perpendicular to the outer surface of the dome 22, i.e., to the front face 20 of the flow control piston 17.

Advantageously, the dome 22 is fixed to a body 25 of the flow control piston 17 by means of a threaded coupling that comprises a screw 26 for fixing the dome 22 to a stem 27 that is perforated at its end and is threaded internally and adapted to accommodate the screw 26 to tighten it.

A compression washer 28 is interposed between the perimetric edges of the dome 22 and of the body 25 and compresses a gasket 29 that is adapted to ensure the tightness of the perimetric coupling of the dome 22 fastened to the body 25.

The body 25 is conveniently cup-shaped and has a side wall 30, which is adapted to slide in a provided cylinder 31, the axis of which forms the sliding axis A, and a backplate 32, which has openings 33 for connection between its two opposite faces.

The connecting openings 33 are part of the connection openings 19 and during use of the valve 10 they allow the passage of fluid through the backplate 32 and therefore the propagation of its pressure state from the region in front of the front face 20 to a chamber 34 that is enclosed by the side wall 30, by the backplate 32 and by the cylinder 31, which the rear face 21 faces.

Figure 2:
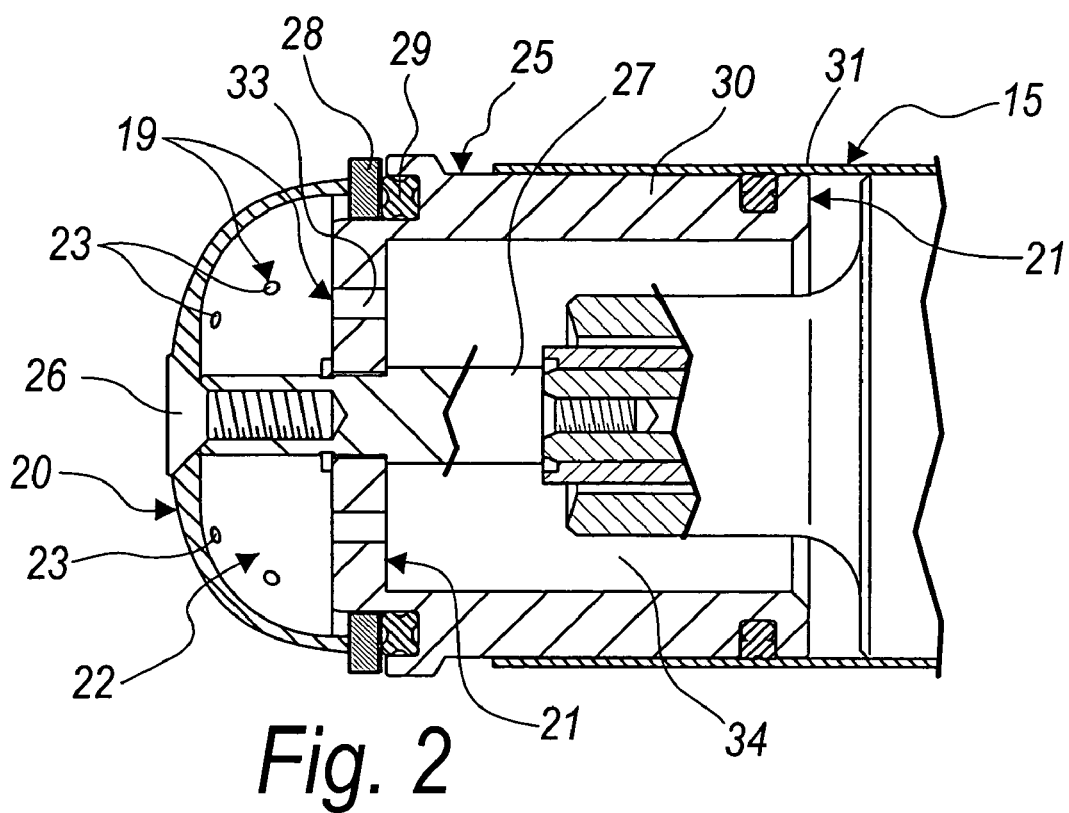
FIG. 2 is an enlarged-scale partially sectional view of a detail of a flow control device of the valve according to the invention.

In a first embodiment of the valve 10, illustrated by way of non-limiting example in FIGS. 1 and 2, the dome 22 is advantageously made of metal plate.

Thus, it can be formed easily by means of a blanking die.

Figure 3:
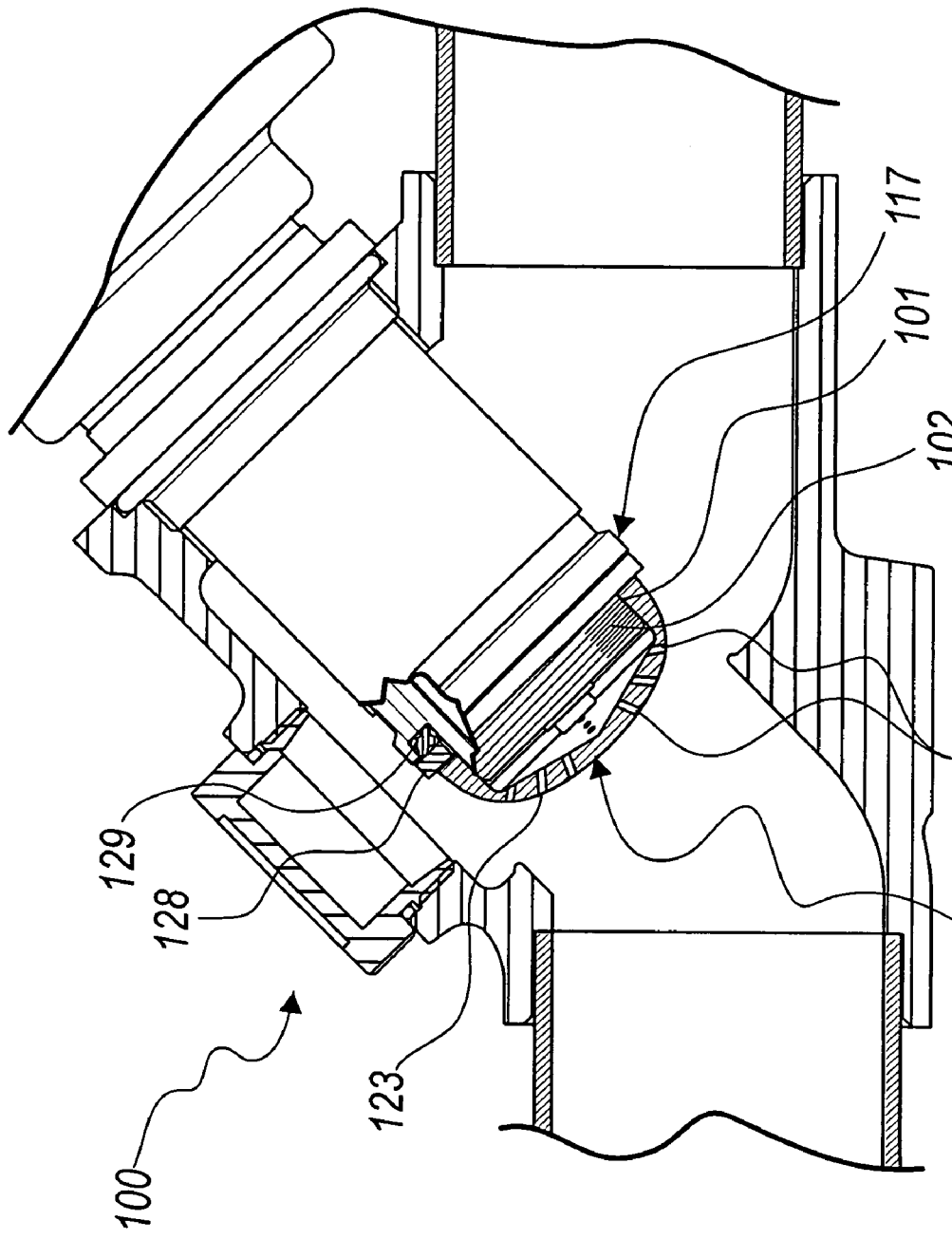

In a substantially equivalent manner, in an alternative embodiment shown by way of example in FIG. 3, the valve 100 according to the invention has the dome 122 that is equipped with an internal thread 101 for connection to the body 125 of the flow control piston 117, which is provided correspondingly with an external thread 102.

In a manner similar to what has already been described, a washer 128 is interposed between the perimetric edges of the dome 122 and of the body 125 for the compression of the gasket 129 that is adapted to ensure the tightness of the perimetric coupling of the dome 122 fastened to the body 125 of the flow control piston 117.

Figure 4:
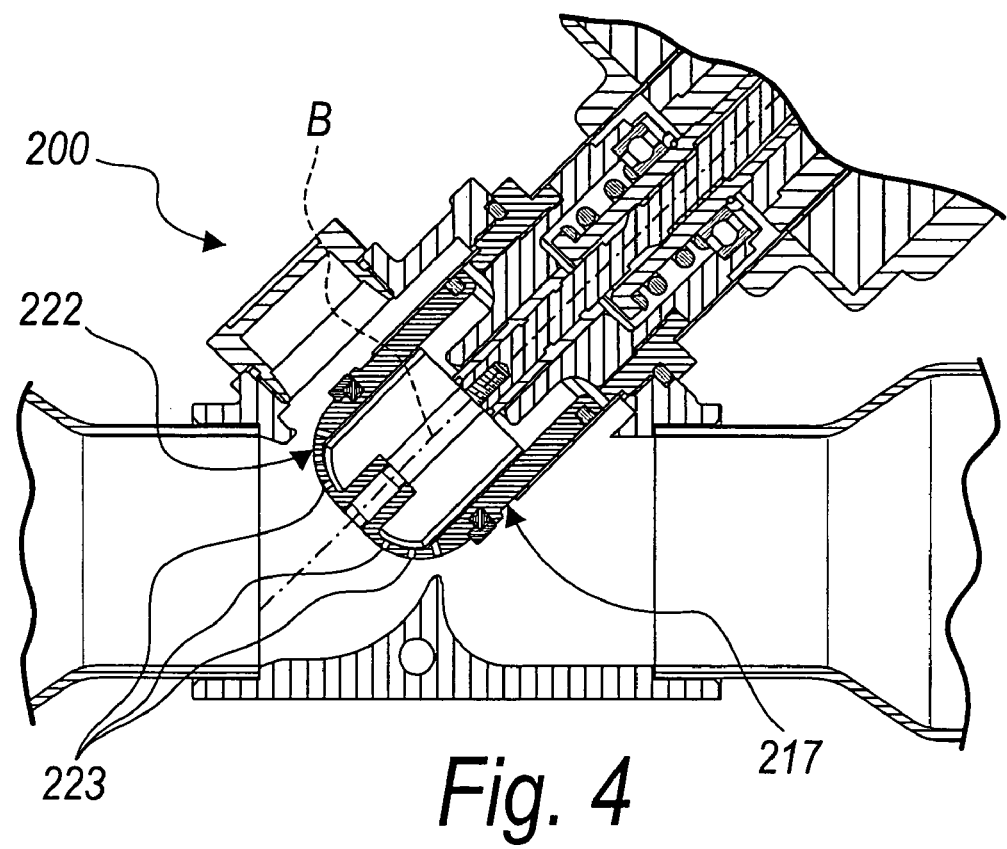
FIGS. 3 and 4 are partially sectional side elevation views of two alternative embodiments of the valve according to the invention.

In a further alternative embodiment of the valve 200 according to the invention, shown in FIG. 4 by way of non-limiting example, the flow control device 215 comprises a flow control piston 217, which comprises monolithically the dome 222, all appropriately made of plastic material.

Holes 223 are provided in the dome 222, according to the arrangement already described, their central axes D being substantially perpendicular to the outer surface of the dome 222.

Advantageously, three rings of respective holes 23, 123 and 223 are provided on the dome 22, 122 or 222, and their outer ports have centers on three circumferences C, as shown in FIG. 5b.

In this case, the three circumferences C, shown in broken lines, conveniently have such radial distances from the axis of extension B as to divide into two rings of equal area each one of three annular bands G, H and I, which are concentric and complementary and into which the plan projection of the dome 22, 122 or 222 is divided; by way of example, in FIG. 5b the annular bands G, H and I are delimited by dot-and-dash lines.

The minor radius of the first annular band G is determined depending on the geometry of the embodiment of the dome, for example for the dome 22 such radius coincides with the radius of the outside perimeter 35 of the engagement seat of the screw 26.

The major radius of the third annular band I coincides with the radius of the perimetric edge 36 of the front face 20 and in the case of the dome 22 it coincides with its outer perimetric edge.

Preferably, the holes 23, 123 and 223 are substantially cylindrical with a diameter of 1 mm.

The operation of the valve 10 according to the invention is as follows.

It should be noted that the operation of the regulating valves 100 and 200 according to the invention is similar and for this reason is not described further.

During the modulation of the position of the flow control piston 17 with respect to the connecting opening 14, the fluid that passes through the valve body 11 applies a pressure that is variable over time and is uneven to the front face 20.

In particular, the static pressure and the pressure component caused by the hydrodynamic effect, which are experienced unevenly by the front face 20 of the flow control piston 17, vary over time.

The resultant force of these pressures can be broken down into a component that is perpendicular to the sliding axis A and a component that is parallel thereto.

The perpendicular component that the flow control piston 17 experiences is balanced by the constraint reactions of the radial supporting means that keep it coaxial to the sliding axis A.

In use, the fluid that engages the connection openings 19 and in particular the holes 23 and the connecting ports 33 transmits the total pressure conditions of the fluid that acts on the front face 20 to the fluid that acts on the rear face 21.

The expression "total pressure" is understood to reference the algebraic sum of the static pressure component and of the pressure component caused by the hydrodynamic effect.

In this manner, the resultant of the forces experienced by the flow control piston 17 along the sliding axis A is given by the algebraic sum of the parallel component and of the pressure force that the fluid applies, parallel to the sliding axis A, onto the rear face 21.

Laboratory tests have revealed surprisingly that this resultant of the forces experienced by the flow control piston 17 along the sliding axis A, upon variation of the opening modulation of the connecting opening 14, is on average smaller than the same resultant experienced by flow control pistons of currently known valves.

This result is allowed by the radially uniform arrangement of the holes 23 with respect to the axis of extension B of the dome, which during use substantially coincides with the sliding axis A.

Indeed, in this manner the fluid that flows by the holes 23 during use of the valve 10 transmits to the fluid in the chamber 34 pressure conditions experienced by the dome 22 in the regions that correspond thereto.

In this manner, the valve 10 according to the invention allows to obtain a pressure of the fluid that acts on the rear face 21 of the flow control piston 17 that approximates with considerable accuracy the pressure experienced by its front face 20, substantially balancing it.

Further, surprisingly the behavior of the valve according to the invention is substantially equivalent if the direction of the outflow of the fluid is reversed.

More particularly, the described effect of balancing the pressure forces along the sliding axis A is substantially equally effective when the fluid enters the valve 10 from the exit port or outlet 13, exiting it from the inlet 12.

In practice it has been found that the invention achieves the intended aim and objects, providing a regulating valve that allows to balance the pressures experienced by the piston during use and is effective substantially in all the positions that it assumes between the open position and the position for blocking the flow of the connection opening, regardless of the direction of outflow of the fluid that passes through it.

Further, the valve according to the invention allows prompt substantial balancing of the pressures experienced by the piston during use during the modulation of its position with respect to the connection opening, thanks to the diffusion of the holes and of the large size of the connection openings.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the contingent shapes and dimensions, may be any according to requirements and to the state of the art.

The disclosures in Italian Patent Application No. PD2008A000252 from which this application claims priority are incorporated herein by reference.

What is claimed is:

1. A regulating valve for regulating the flow of fluid in refrigeration systems, comprising
    a valve body that has an inlet and an outlet for fluid, said inlet and said outlet being mutually connected by a connecting opening,
    a flow control device for said connecting opening, which is inserted in a seat formed in said valve body, said flow control device comprising an electric motor and a flow control piston, said electric motor being functionally connected to said flow control piston for axial controlled movement thereof along a sliding axis, between an open position and a blocking position of said connecting opening,
    said flow control piston having connection openings for connection between a front face thereof, which is directed toward said connecting opening, and a rear face thereof for balancing pressures applied by the fluid to said front face, said flow control piston having a head dome that faces said connecting opening and forms said front face, said connection openings comprising a plurality of mutually separate cylindrical holes that pass through said dome, said dome having a structure that is symmetrical around an axis of extension thereof, said holes being provided on the dome at radial distances from said axis of extension that increase according to an inverse square progression, said holes having port centers thereof that face externally said dome, arranged on radial circumferences that are mutually spaced with respect to said axis of extension so as to divide into two rings of equal area annular bands having equal surface area, into which a plan projection of said dome is divided.

2. The valve of claim 1, wherein said holes are provided in said dome in groups which are symmetrical with respect to said axis of extension.

3. The valve of claim 2, wherein the holes that belong to a same one of said hole groups have central axes that lie on a common plane that is radial to said axis of extension.

4. The valve of claim 3 wherein said central axes are locally perpendicular to an outer surface of said dome.

5. The valve of claim 1, wherein said dome is made of metal plate.

6. The valve of claim 1, wherein said dome and said flow control piston are provided having a monolithic construction.

7. The valve of claim 1, wherein said dome is made of a plastic material.

* * * * *